(12) United States Patent
Moorman et al.

(10) Patent No.: US 8,733,521 B2
(45) Date of Patent: May 27, 2014

(54) APPARATUS FOR AND METHOD OF CONTROLLING A DUAL CLUTCH TRANSMISSION

(75) Inventors: Steven P. Moorman, Dexter, MI (US); Christopher Jay Weingartz, Holly, MI (US)

(73) Assignee: GM Global Technology Operations, Detroit, MI (US)

( * ) Notice: Subject to any disclaimer, the term of this patent is extended or adjusted under 35 U.S.C. 154(b) by 222 days.

(21) Appl. No.: 13/228,765

(22) Filed: Sep. 9, 2011

(65) Prior Publication Data

US 2012/0138413 A1 Jun. 7, 2012

Related U.S. Application Data

(60) Provisional application No. 61/420,161, filed on Dec. 6, 2010.

(51) Int. Cl.
*B60W 10/02* (2006.01)

(52) U.S. Cl.
USPC ........................................................ 192/3.58

(58) Field of Classification Search
USPC ..................... 192/3.58, 3.57, 3.52, 3.54, 3.55
See application file for complete search history.

(56) References Cited

U.S. PATENT DOCUMENTS

| | | | |
|---|---|---|---|
| 3,774,475 A | 11/1973 | Meysenburg et al. | |
| 3,834,499 A | 9/1974 | Candellero et al. | |
| 4,589,295 A | 5/1986 | Jerry et al. | |
| 4,653,352 A | 3/1987 | Nakao et al. | |
| 4,944,202 A | 7/1990 | Gierer | |
| 5,441,459 A | 8/1995 | Inukai et al. | |
| 5,813,940 A | 9/1998 | Ramm et al. | |
| 5,950,781 A | 9/1999 | Adamis et al. | |
| 6,675,668 B2 | 1/2004 | Schamscha | |
| 6,698,304 B2 | 3/2004 | Gierling et al. | |
| 6,715,597 B1 | 4/2004 | Buchanan et al. | |
| 6,789,658 B2 | 9/2004 | Busold et al. | |
| 6,827,191 B2 | 12/2004 | Kuhstrebe | |
| 6,883,394 B2 | 4/2005 | Koenig et al. | |
| 6,941,830 B2 | 9/2005 | Ibamoto et al. | |
| 7,044,013 B2 | 5/2006 | Ahrens | |
| 7,048,672 B2 | 5/2006 | Bothe et al. | |
| 7,300,375 B2 | 11/2007 | Petrzik | |
| 7,401,689 B2* | 7/2008 | Hegerath et al. | 192/3.58 |
| 7,410,438 B2* | 8/2008 | Moehlmann et al. | 475/116 |
| 7,464,617 B2 | 12/2008 | Baldascini et al. | |

(Continued)

FOREIGN PATENT DOCUMENTS

| | | |
|---|---|---|
| DE | 2141564 A1 | 2/1973 |
| DE | 4117736 C1 | 5/1992 |

(Continued)

*Primary Examiner* — David D Le
*Assistant Examiner* — David J Hlavka

(57) ABSTRACT

The present invention provides a method of operating an electro-hydraulic control system for a dual clutch transmission having seven forward speeds or gear ratios and reverse. The control system includes an oil delivery subsystem, a clutch control subsystem and a synchronizer control subsystem. All three subsystems are under the control of a transmission control module. The method of operation includes gathering data from various shaft speed, clutch position and shift actuator position sensors and utilizing pressure control (PCS) and flow control (FCS) solenoid valves and a logic valve to pre-stage and engage (and disengage) hydraulic shift actuators associated with a requested and current gear and to sequentially engage one of a pair of input clutches.

18 Claims, 7 Drawing Sheets

(56) References Cited

U.S. PATENT DOCUMENTS

| | | | |
|---|---|---|---|
| 7,464,618 B2 * | 12/2008 | Mohlmann et al. | 74/346 |
| 7,472,616 B2 | 1/2009 | Dreher et al. | |
| 7,478,572 B2 | 1/2009 | Maten et al. | |
| 7,487,866 B2 | 2/2009 | Kruse et al. | |
| 7,575,533 B2 | 8/2009 | Gumpoltsberger | |
| 7,591,203 B2 | 9/2009 | Ochi et al. | |
| 7,608,008 B2 | 10/2009 | Seo | |
| 7,621,840 B2 | 11/2009 | Kamm et al. | |
| 7,707,911 B2 | 5/2010 | Grethel et al. | |
| 8,475,336 B2 * | 7/2013 | Whitmarsh et al. | 477/79 |
| 2001/0036878 A1 | 11/2001 | Itou et al. | |
| 2002/0060113 A1 | 5/2002 | Harries | |
| 2002/0119864 A1 | 8/2002 | Harries | |
| 2003/0075408 A1 * | 4/2003 | Alfredsson | 192/3.25 |
| 2003/0226416 A1 | 12/2003 | Umemoto et al. | |
| 2004/0038765 A1 | 2/2004 | Fujimine et al. | |
| 2005/0067251 A1 | 3/2005 | Braford et al. | |
| 2005/0107214 A1 | 5/2005 | Koenig | |
| 2005/0272559 A1 | 12/2005 | Bothe et al. | |
| 2007/0175726 A1 | 8/2007 | Combes et al. | |
| 2008/0108472 A1 | 5/2008 | Seo | |
| 2008/0108474 A1 | 5/2008 | Seo | |
| 2008/0207392 A1 | 8/2008 | Staudinger et al. | |
| 2008/0210032 A1 * | 9/2008 | Uberti et al. | 74/335 |
| 2008/0223683 A1 | 9/2008 | Grethel | |
| 2008/0234093 A1 | 9/2008 | Diosi et al. | |
| 2008/0242493 A1 | 10/2008 | Carey et al. | |
| 2008/0305911 A1 | 12/2008 | Moorman et al. | |
| 2009/0000897 A1 | 1/2009 | Staudinger et al. | |
| 2009/0017963 A1 | 1/2009 | Hart et al. | |
| 2009/0048061 A1 | 2/2009 | Hart et al. | |
| 2009/0151495 A1 * | 6/2009 | Garabello et al. | 74/473.11 |
| 2009/0157271 A1 * | 6/2009 | Garabello et al. | 701/55 |
| 2009/0221394 A1 | 9/2009 | Phillips et al. | |
| 2009/0247351 A1 | 10/2009 | Seo et al. | |
| 2011/0138956 A1 | 6/2011 | Moorman | |

FOREIGN PATENT DOCUMENTS

| | | |
|---|---|---|
| DE | 4320353 A1 | 1/1994 |
| DE | 29714652 U1 | 10/1997 |
| DE | 19921301 A1 | 11/1999 |
| DE | 19849488 A1 | 5/2000 |
| DE | 19931973 A1 | 1/2001 |
| DE | 10125172 A1 | 11/2002 |
| DE | 10134115 A1 | 1/2003 |
| DE | 10243282 A1 | 4/2004 |
| DE | 102005029963 A1 | 2/2007 |
| DE | 102005029964 A1 | 3/2007 |
| DE | 102005050479 A1 | 5/2007 |
| DE | 102006005858 A1 | 8/2007 |
| DE | 102008008454 A1 | 9/2008 |
| DE | 102008058692 A1 | 6/2009 |
| EP | 0477564 A2 | 4/1992 |
| EP | 1400733 A2 | 3/2004 |
| EP | 1433976 A1 | 6/2004 |
| EP | 1469235 A1 | 10/2004 |
| EP | 1519082 A1 | 3/2005 |
| EP | 1589262 A1 | 10/2005 |
| EP | 1645786 A2 | 4/2006 |
| EP | 1767824 A1 | 3/2007 |
| EP | 1851466 A2 | 11/2007 |
| EP | 2151586 A2 | 2/2010 |
| FR | 2808065 A1 | 10/2001 |
| GB | 2415022 B | 7/2007 |
| JP | 58102851 A | 8/1983 |
| JP | 2007010145 A | 1/2007 |
| WO | WO9705410 A1 | 2/1997 |
| WO | WO9919644 A1 | 4/1999 |
| WO | WO2004015302 A1 | 2/2004 |
| WO | WO2004076225 A1 | 9/2004 |
| WO | WO2004097265 A1 | 11/2004 |
| WO | WO2005078319 A1 | 8/2005 |
| WO | WO2006094711 A1 | 9/2006 |
| WO | WO2007017012 A1 | 2/2007 |
| WO | WO2009037170 A1 | 3/2009 |
| WO | WO2009048649 A3 | 4/2009 |
| WO | WO2010028745 A2 | 3/2010 |

* cited by examiner

APPARATUS FOR AND METHOD OF CONTROLLING A DUAL CLUTCH TRANSMISSION

CROSS REFERENCE TO RELATED APPLICATION

This application claims the benefit of U.S. Provisional Patent Application Ser. No. 61/420,161, filed Dec. 6, 2010, which is hereby incorporated in its entirety herein by reference.

FIELD

The present disclosure relates to an apparatus for and a method of controlling a dual clutch transmission and more particularly to an electro-hydraulic apparatus for and a method of controlling a dry dual clutch transmission having seven forward speeds or gear ratios and reverse.

BACKGROUND

The statements in this section merely provide background information related to the present disclosure and may or may not constitute prior art.

In automotive transmission art, the dual clutch transmission (DCT) is a relative newcomer. A typical dual clutch transmission configuration includes a pair of mutually exclusively operating input clutches which selectively drive a pair of input shafts. The input shafts may be disposed on opposite sides of an output shaft or may be disposed concentrically between spaced-apart output shafts. One of each of a plurality of pairs of constantly meshing gears which provide the various forward and reverse gear ratios is freely rotatably disposed on one of the shafts and the other of each pair of gears is coupled to one of the other shafts. A plurality of synchronizer clutches selectively synchronize and connect the freely rotatable gears to the associated shaft to achieve forward and reverse gear ratios.

Dual clutch transmissions are known for their sporty, performance oriented operating characteristics which mimic those of a conventional mechanical (manual) transmission. They also typically exhibit good fuel economy due to their good gear mesh efficiency, ratio selection flexibility, reduced clutch Whereas the basic mechanical configuration of the dual clutch transmission is well established, the control components and operating methods utilized thereby, which are the key to achieving the dual clutch transmission's performance and operational capabilities, are anything but. Extensive and ongoing research and engineering effort directed to the control components and operating methods continue to be exerted to achieve further improvements in dual clutch transmission performance. The present invention is so directed.

SUMMARY

The present invention provides a method of operating an electro-hydraulic control system for a dual clutch transmission having seven forward speeds or gear ratios and reverse. The control system includes an oil delivery subsystem, a clutch control subsystem and a synchronizer control subsystem. All three subsystems are under the control of a transmission control module. The method of operation includes gathering data from various shaft speed, clutch position and shift actuator position sensors and utilizing pressure control (PCS) and flow control (FCS) solenoid valves and a logic valve to pre-stage and engage (and disengage) hydraulic shift actuators associated with a requested and current gear and to sequentially engage one of a pair of input clutches. The clutch control subsystem includes one or a pair of pressure control solenoid (PCS) valves, a pair of flow control solenoid (FCS) valves and a respective pair of hydraulic clutch actuators, each including a position sensor. The synchronizer control subsystem includes one pressure control solenoid (PCS) valve, three flow control solenoid (FCS) valves, a mode or logic valve, a mode or logic valve solenoid valve and four three position shift fork actuators, each including a position sensor.

Thus it is an aspect of the present invention to provide an electro-hydraulic control system for a dual clutch transmission.

It is a further aspect of the present invention to provide a method of operating an electro-hydraulic control system for a dual clutch transmission having seven forward speeds or gear ratios and reverse.

It is a still further aspect of the present invention to provide a method of operating an electro-hydraulic control system for a dual clutch transmission including an oil delivery system.

It is a still further aspect of the present invention to provide a method of operating an electro-hydraulic control system for a dual clutch transmission including a clutch control system having one or a pair of pressure control solenoid (PCS) valves, a pair of flow control solenoid (FCS) valves and a respective pair of hydraulic clutch actuators It is a still further aspect of the present invention to provide a method of operating an electro-hydraulic control system for a dual clutch transmission including a synchronizer control system having one pressure control solenoid (PCS) valve, three flow control solenoid (FCS) valves, a mode or logic valve, a mode valve solenoid valve and four three position shift fork actuators.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 9:
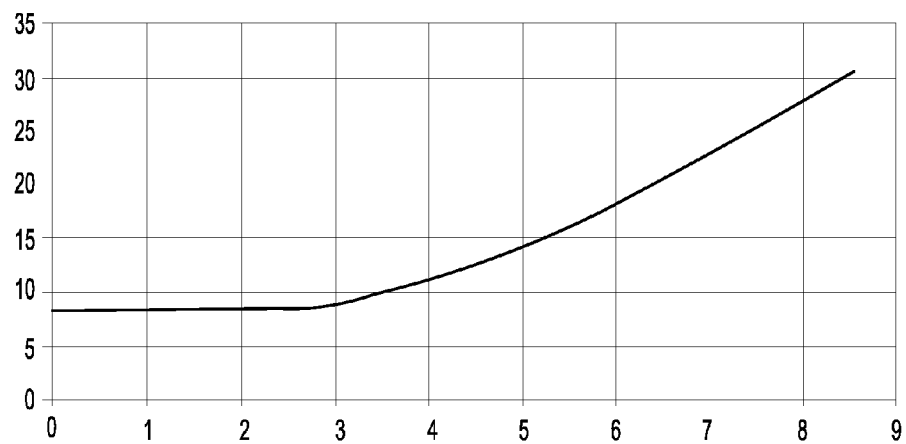
Figure 10:
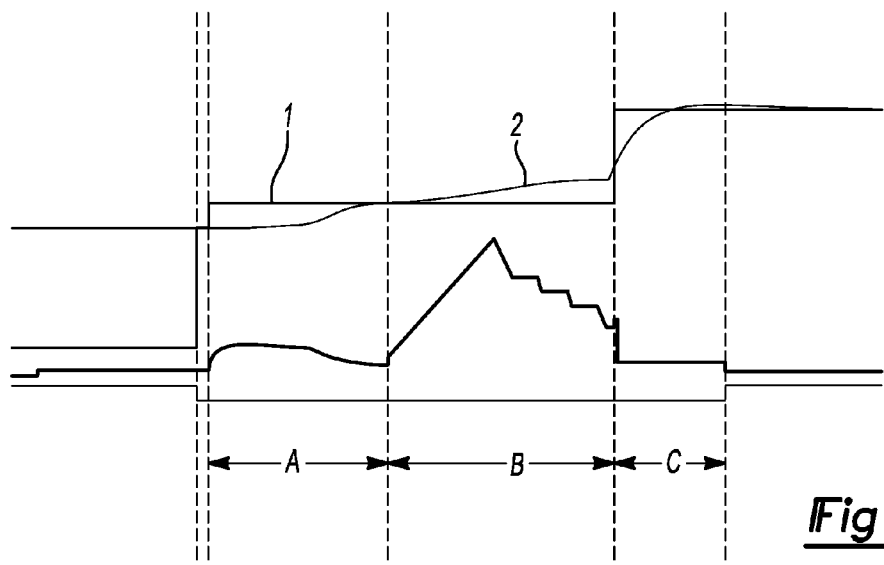

FIG. 9 is a graph presenting a plot of input clutch operation with clutch pressure in bars on the Y (vertical axis) versus clutch position in millimeters on the X (horizontal) axis in a control system for a dual clutch transmission according to the present invention; and FIG. 10 is a time plot of the synchronizer engagement sequence in a control system for a dual clutch transmission according to the present invention.

DETAILED DESCRIPTION

The following description is merely exemplary in nature and is not intended to limit the present disclosure, application, or uses.

Figure 1:
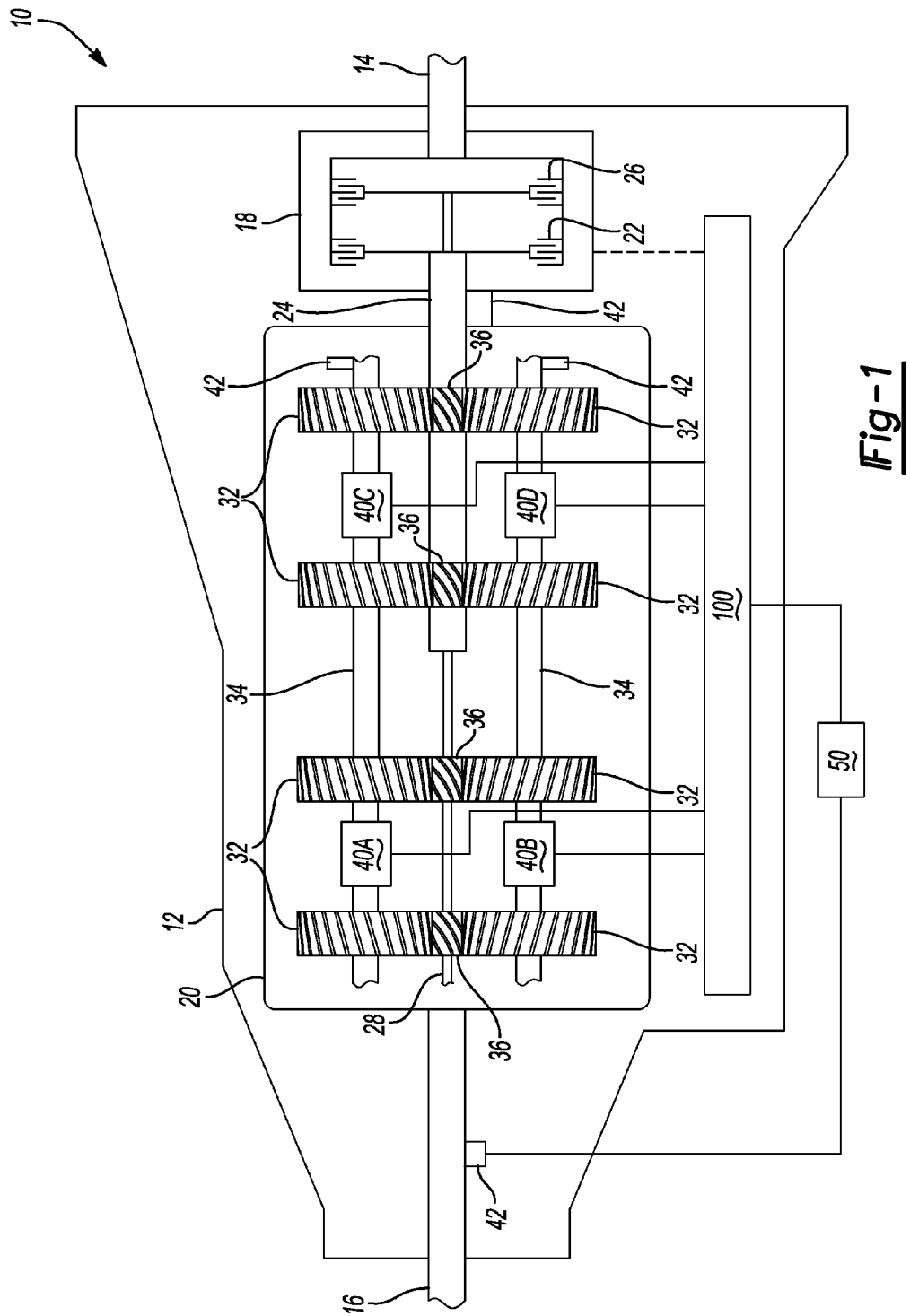
FIG. 1 is a diagrammatic view of a dry dual clutch transmission having seven forward gears or speed ratios and reverse which may be utilized with the present invention.

With reference to FIG. 1, an exemplary dual clutch transmission (DCT) according to the present invention is illustrated and generally designated by the reference number 10. The dual clutch transmission 10 includes a typically cast, metal housing 12 which encloses, mounts and protects the various components of the transmission 10. The housing 12 includes a variety of apertures, passageways, shoulders and flanges which receive, position and support these components. The transmission 10 includes an input shaft 14, an output shaft 16, a dry dual clutch assembly 18, and a gear arrangement 20. The input shaft 14 is connected to and driven by a prime mover (not shown) such as an internal combustion gas or Diesel engine or a hybrid or electric power plant. The output shaft 16 is preferably connected with a final drive unit (not shown) which may include, for example, propshafts, differential assemblies, and drive axles. The input shaft 14 is coupled to and drives the dual clutch assembly 18. The dual clutch assembly 18 preferably includes a pair of concentrically disposed, selectively and mutually exclusively engageable torque transmitting devices: a first torque transmitting device 22 which provides torque to a first shaft or drive member 24 and a second torque transmitting device 26 which provides drive torque to a second shaft or drive member 28. The torque transmitting devices 22 and 26 are preferably dry friction clutches.

The gear arrangement 20 includes a plurality of gears, indicated generally by reference numbers 32 which are freely rotatably disposed upon a pair of parallel countershafts or layshafts, indicated generally by reference numbers 34. The plurality of gears 32 also includes additional gears 36 that are connected to either the first drive shaft or member 24 or the second drive shaft or member 28. The additional gears 36 are in constant mesh with and drive the plurality of gears 32 which provide the various speed ratios and, with an idler gear (not illustrated), reverse. Typically, an output gear (not illustrated) is coupled to each of the countershafts or layshafts 34 and both engage a gear (also not illustrated) coupled to the output shaft 16. It should be appreciated that the specific arrangement and number of the gears 32 and the specific arrangement and number of the shafts 24, 28 and 34 within the transmission 10 may vary without departing from the scope of the present invention.

The gear arrangement 20 further includes a first synchronizer assembly 40A, a second synchronizer assembly 40B, a third synchronizer assembly 40C and a fourth synchronizer assembly 40D. The synchronizer assemblies 40A, 40B, 40C and 40D are operable to selectively connect individual gears of the plurality of gears 32 to an associated one of the countershafts or layshafts 34. Each synchronizer assembly 40A, 40B, 40C and 40D is disposed between adjacent pairs of the gears 32 and includes a shift rail and fork assembly, a synchronizer including a sleeve and blocker ring and a positive clutch, such as a dog or face clutch (all not illustrated). Each synchronizer assembly 40A, 40B, 40C and 40D, when activated, synchronizes the speed of a gear 32 to that of the associated countershaft or layshaft 34 and then positively connects or couples the gear 32 to the shaft 34. Preferably, the transmission 10 also includes a plurality of shaft speed sensors 42 which sense, for example, the speeds of the first and second drive shafts or members 24 and 28, the countershafts or layshafts 34 and the output shaft 16.

The transmission 10 also includes a transmission control module (TCM) or similar electronic controller 50. The transmission control module 50 is preferably an electronic control device having a preprogrammed digital computer or processor, control logic, memory used to store data, and at least one I/O peripheral. The control logic includes a plurality of logic routines for monitoring, manipulating, and generating data. The transmission control module 50 receives data from various sensors such as the speed sensors 42 and controls the actuation of the dual clutch assembly 18 and the synchronizer assemblies 40A, 40B, 40C and 40D through a hydraulic control system 100 according to the principles of the present invention.

Figure 2A:
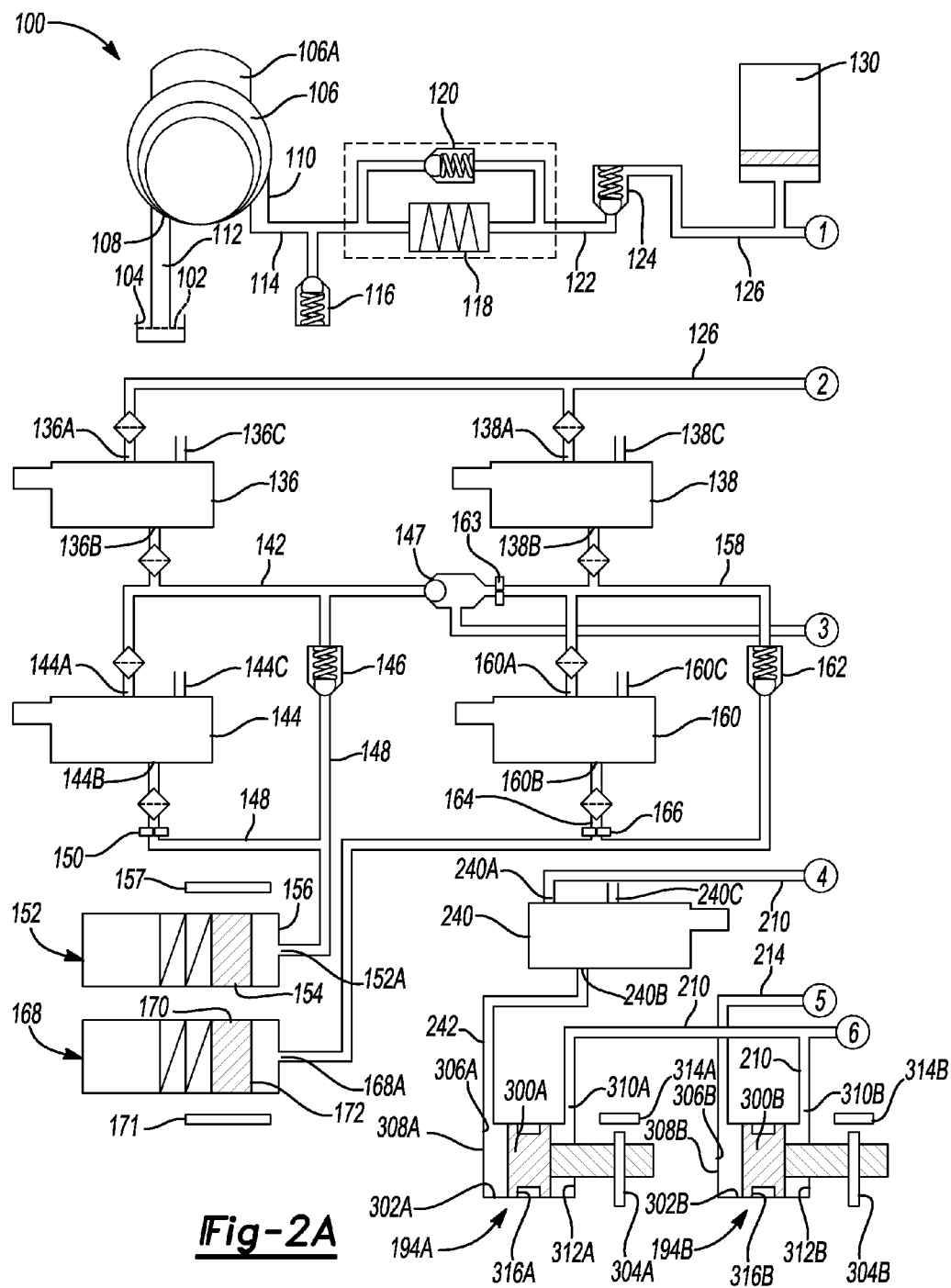
FIGS. 2A and 2B are a schematic diagram of a first embodiment of the components and hydraulic and electrical interconnections of a control system for a dual clutch transmission according to the present invention.
Figure 2B:
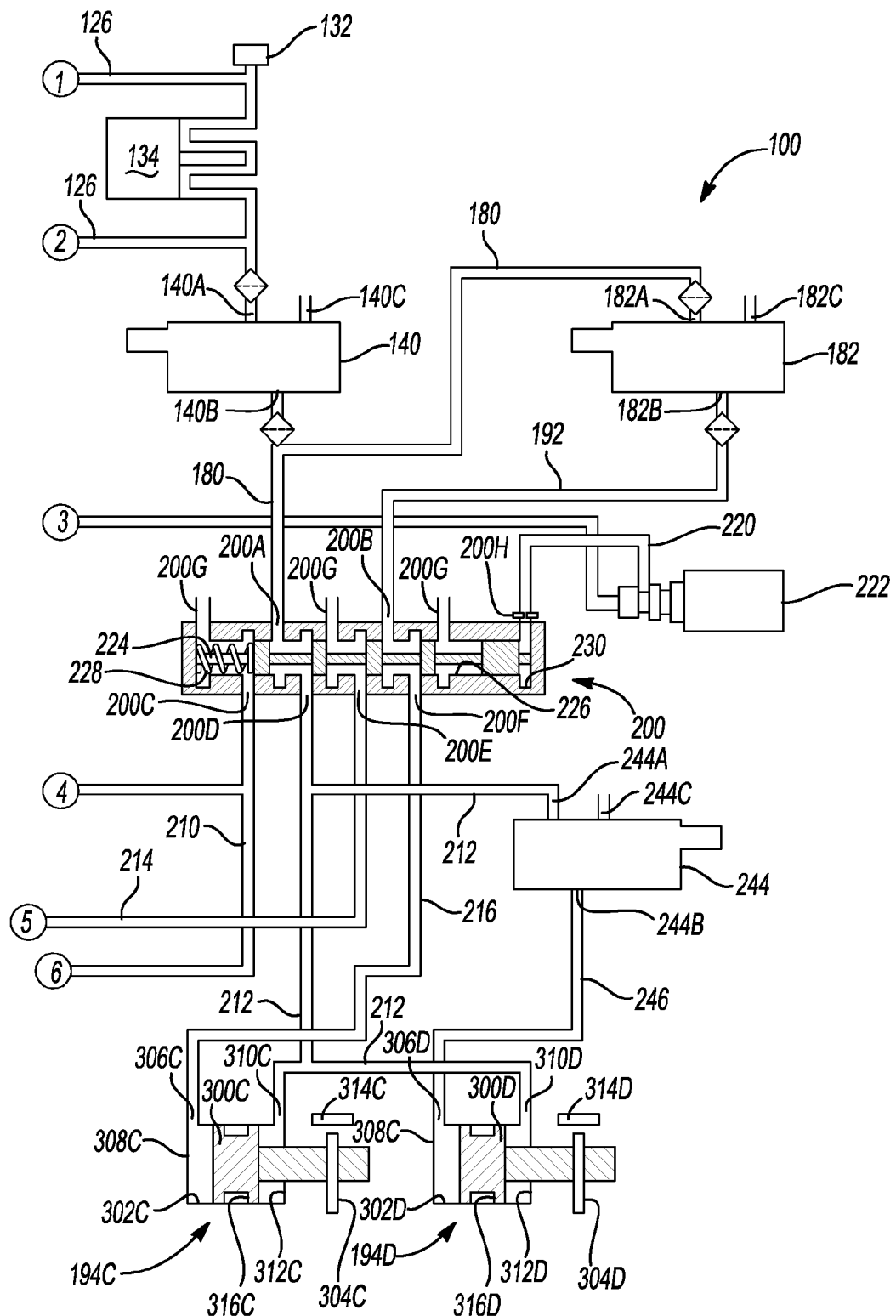

Turning to FIGS. 2A and 2B, the hydraulic control system 100 of the present invention is operable to selectively engage the dual clutch assembly 18 and the synchronizer assemblies 40A, 40B, 40C and 40D, by selectively communicating a hydraulic fluid 102 from a sump 104 to a plurality of shift actuating devices, as will be described in greater detail below. The sump 104 is a tank or reservoir preferably disposed at the bottom of the transmission housing 12 to which the hydraulic fluid 102 returns and collects from various components and regions of the transmission 10. The hydraulic fluid 102 is drawn or suctioned from the sump 104 by a pump 106. The pump 106 is preferably driven by an electric motor 106A or any other type of prime mover and may be, for example, a gear pump, a vane pump, a gerotor pump, or any other positive displacement pump. The pump 106 includes an inlet port 108 and an outlet port 110. The inlet port 108 communicates with the sump 104 through a suction line 112. The outlet port 110 provides pressurized hydraulic fluid 102 to a supply line 114. The supply line 114 is in communication with a spring biased blow-off safety valve 116, a pressure side filter 118, and a spring biased check valve 120. The spring biased blow-off safety valve 116 communicates with the sump 104. The spring biased blow-off safety valve 116 is set at a relatively high predetermined pressure and if the pressure of the hydraulic fluid 102 in the supply line 114 exceeds this pressure, the safety valve 116 opens momentarily to relieve and reduce the pressure of the hydraulic fluid 102 by allowing fluid 102 to return to sump 104. The pressure side filter 118 is disposed in parallel with the spring biased check valve 120. If the pressure side filter 118 becomes blocked or partially blocked, pressure within supply line 114 increases and opens the spring biased check valve 120 in order to allow the hydraulic fluid 102 to bypass the pressure side filter 118. This feature prevents starvation of the various components of the hydraulic control system 100 in the event the pressure side filter 118 becomes blocked or partially blocked.

The pressure side filter 118 and the spring biased check valve 120 each communicate with an outlet line 122. The outlet line 122 is in communication with a second check valve 124. The second check valve 124 is in communication with a main supply line 126 and is configured to maintain hydraulic pressure within the main supply line 126. The main supply line 126 supplies pressurized hydraulic fluid 102 to an accumulator 130 and a main pressure sensor 132. The accumulator 130 is an energy storage device in which the non-compressible hydraulic fluid 102 is held under pressure by an external source. In the example provided, the accumulator 130 is a spring type or gas filled type accumulator having a spring or compressible gas that provides a compressive force on the hydraulic fluid 102 within the accumulator 130. However, it should be appreciated that the accumulator 130 may be of other types, such as a gas-charged type, without departing from the scope of the present invention. Accordingly, the accumulator 130 is operable to supply pressurized hydraulic fluid 102 back to the main supply line 126. However, upon discharge of the accumulator 130, the second check valve 124 prevents the pressurized hydraulic fluid 102 from returning to the pump 106. The accumulator 130, when charged, effectively replaces the pump 106 as the source of pressurized hydraulic fluid 102 in main supply line 126, thereby eliminating the need for the pump 106 to run continuously. The main pressure sensor 132 reads the pressure of the hydraulic fluid 102 within the main supply line 126 in real time and provides this data to the transmission control module 50.

The main supply line 126 is channeled through a heat sink 134 used to cool the transmission control module 50, though it should be appreciated that the heat sink 134 may be located elsewhere or removed from the hydraulic control system 100 without departing from the scope of the present invention. Moreover, the main supply line 126 supplies pressurized hydraulic fluid 102 to three pressure control devices including a first clutch pressure control device 136, a second clutch pressure control device 138 and an actuator pressure control device 140.

The first clutch pressure control device (PCS) 136 is preferably an electrically controlled variable force solenoid having an internal closed loop pressure control. Various makes, types, and models of solenoids may be employed with the present invention so long as the first clutch pressure control device 136 is operable to control the pressure of the hydraulic fluid 102. The first clutch pressure control device 136 includes an inlet port 136A that communicates with an outlet port 136B when the first clutch pressure control device 136 is activated or energized and includes an exhaust port 136C that communicates with the outlet port 136B when the first clutch pressure control device 136 is inactive or de-energized. Variable activation of the first clutch pressure control device 136 regulates or controls the pressure of the hydraulic fluid 102 as the hydraulic fluid 102 communicates from the inlet port 136A to the outlet port 136B. The internal closed loop pressure control provides pressure feedback within the solenoid to adjust the amount of flow to the outlet port 136B based on a particular current command from the transmission control module 50, thereby controlling pressure. The inlet port 136A is in communication with the main supply line 126. The outlet port 136B is in communication with an intermediate hydraulic line 142. The exhaust port 136C is in communication with the sump 104.

The intermediate hydraulic line 142 communicates the hydraulic fluid 102 from the first clutch pressure control device 136 to a first clutch flow control (FCS) device 144 and to a first and a second pressure limit control valve or check ball valve 146 and 147. The first clutch flow control device 144 is preferably an electrically controlled variable force solenoid that is operable to control a flow of the hydraulic fluid 102 from the first clutch flow control device 144 in order to actuate the first torque transmitting device 22, as will be described in greater detail below. The first clutch flow control device 144 includes an inlet port 144A that communicates with an outlet port 144B when the first clutch flow control device 144 is activated or energized and includes an exhaust port 144C that communicates with the outlet port 144B when the first clutch flow control device 144 is inactive or de-energized. Variable activation of the first clutch flow control device 144 regulates or controls the flow of the hydraulic fluid 102 as the hydraulic fluid 102 communicates from the inlet port 144A to the outlet port 144B. The inlet port 144A is in communication with the intermediate hydraulic line 142. The outlet port 144B is in communication with a first clutch supply line 148 and a flow restriction orifice 150. The exhaust port 144C is in communication with the sump 104. The first pressure limit control valve or check ball valve 146 is disposed in parallel with the first clutch flow control solenoid 144 and is in communication with the intermediate hydraulic line 142 and the first clutch supply line 148. If pressure within the first clutch supply line 148 exceeds a predetermined value, the first pressure limit control valve or check ball valve 146 opens to relieve and reduce the pressure by allowing hydraulic fluid 102 to flow into the intermediate hydraulic line 142.

The first clutch supply line 148 is in fluid communication with an inlet/outlet port 152A of a first clutch piston assembly 152. The first clutch piston assembly 152 includes a single acting piston 154 slidably disposed in a cylinder 156. The piston 154 translates within cylinder 156 under hydraulic pressure to engage the first torque transmitting device 22, shown in FIG. 1. A first linear clutch position sensor 157 provides data to the transmission control module 50 regarding the instantaneous position of the piston 154. When the first clutch flow control device 144 is activated or energized, a flow of pressurized hydraulic fluid 102 is provided to the first clutch supply line 148. The flow of pressurized hydraulic fluid 102 is communicated from the first clutch supply line 148 to the first clutch piston assembly 152 where the pressurized hydraulic fluid 102 translates the piston 154, thereby engaging the first torque transmitting device 22. When the first clutch flow control solenoid 144 is de-energized, the inlet port 144A is closed and the hydraulic fluid 102 from the cylinder 156 is pressed into supply line 148 by piston 154 and then though the outlet port 144B. The first clutch flow control solenoid 144 passes the hydraulic fluid 102 from outlet port 144B to the exhaust port 144C and into the sump 104, thereby disengaging the first torque transmitting device 22.

The second clutch pressure control device 138 is preferably an electrically controlled variable force solenoid having an internal closed loop pressure control. Various makes, types, and models of solenoids may be employed with the present invention so long as the second clutch pressure control device 138 is operable to control the pressure of the hydraulic fluid 102. The second clutch pressure control device 138 includes an inlet port 138A that communicates with an outlet port 138B when the second clutch pressure control device 138 is activated or energized and includes an exhaust port 138C that communicates with the outlet port 138B when the second clutch pressure control device 138 is inactive or de-energized. Variable activation of the second clutch pressure control device 138 regulates or controls the pressure of the hydraulic fluid 102 as the hydraulic fluid 102 passes from the inlet port 138A to the outlet port 138B. The internal closed loop pressure control provides pressure feedback within the solenoid to adjust the amount of flow of hydraulic fluid 102 to the outlet port 138B based on a particular current command from the transmission control module 50, thereby controlling pressure. The inlet port 138A is in communication with the main supply line 126. The outlet port 138B is in communication with an intermediate fluid line 158. The exhaust port 138C is in communication with the sump 104.

The intermediate fluid line 158 communicates the hydraulic fluid 102 from the second clutch pressure control device 138 to a second clutch flow control device 160, to a third pressure limit control valve or check ball valve 162 and to a flow restriction orifice 163. The second clutch flow control device 160 is preferably an electrically controlled variable force solenoid that is operable to control a flow of the hydraulic fluid 102 from the second clutch flow control device 160 in order to actuate the second torque transmitting device 26, as will be described in greater detail below. The second clutch flow control device 160 includes an inlet port 160A that communicates with an outlet port 160B when the second clutch flow control device 160 is activated or energized and includes an exhaust port 160C that communicates with the outlet port 160B when the second clutch flow control device 160 is inactive or de-energized. Variable activation of the second clutch flow control device 160 regulates or controls the flow of the hydraulic fluid 102 from the inlet port 160A to the outlet port 160B. The inlet port 160A is in communication with the intermediate fluid line 158. The outlet port 160B is in communication with a second clutch supply line 164 and a flow restriction orifice 166. The exhaust port 160C is in communication with the sump 104. The third pressure limit control valve 162 is disposed in parallel with the second clutch flow control solenoid 160 and is in communication with the second clutch supply line 164. If pressure within the second clutch supply line 164 exceeds a predetermined value, the third pressure limit control valve 162 opens to relieve and reduce the pressure.

The second clutch supply line 164 is in fluid communication with an inlet/outlet port 168A of a second clutch piston assembly 168. The second clutch piston assembly 168 includes a single acting piston 170 slidably disposed in a cylinder 172. The piston 170 translates under hydraulic pressure to engage the second torque transmitting device 26, shown in FIG. 1. A second linear clutch position sensor 171 provides data to the transmission control module 50 regarding the instantaneous position of the piston 170. When the second clutch flow control device 160 is activated or energized, a flow of pressurized hydraulic fluid 102 is provided to the second clutch supply line 164. The flow of pressurized hydraulic fluid 102 is communicated from the second clutch supply line 164 to the second clutch piston assembly 168 where the pressurized hydraulic fluid 102 translates the piston 170, thereby engaging the second torque transmitting device 26. When the second clutch flow control solenoid 160 is de-energized, the inlet port 160A is closed and hydraulic fluid from the cylinder 172 is pressed into supply line 164 by piston 170 and then though the outlet port 160B to the exhaust port 160C and into the sump 104. The second clutch flow control solenoid 160 passes the fluid from outlet port 160B to the exhaust port 160C and into the sump 104, thereby disengaging the second torque transmitting device 26.

The actuator pressure control device 140 is preferably an electrically controlled variable force solenoid having an internal closed loop pressure control. Various makes, types, and models of solenoids may be employed with the present invention so long as the actuator pressure control device 140 is operable to control the pressure of the hydraulic fluid 102. The actuator pressure control device 140 includes an inlet port 140A that communicates with an outlet port 140B when the actuator pressure control device 140 is activated or energized and includes an exhaust port 140C that communicates with the outlet port 140B when the actuator pressure control device 140 is inactive or de-energized. Variable activation of the actuator pressure control device 140 regulates or controls the pressure of the hydraulic fluid 102 as the hydraulic fluid 102 is channeled from the inlet port 140A to the outlet port 140B. More specifically, an internal closed loop pressure control provides pressure feedback within the device 140 to adjust the amount of flow to the outlet port 140B based on a particular current command from the controller 50, thereby controlling pressure. The inlet port 140A is in communication with the main supply line 126. The outlet port 140B is in communication with a valve feed line 180. The exhaust port 140C is in communication with the sump 104.

The valve feed line 180 communicates pressurized hydraulic fluid 102 from the actuator pressure control device 140 to a third flow control device (VFS) 182 and a valve assembly 200. The third flow control device 182 is preferably an electrically controlled variable force solenoid. Various makes, types, and models of solenoids may be employed with the present invention so long as the third flow control device 182 is operable to control the flow of the hydraulic fluid 102. The third flow control device 182 includes an inlet port 182A that communicates through an adjustable hydraulic orifice or restriction with an outlet port 182B when the third flow control device 182 is activated or energized and includes an exhaust port 182C that communicates with the outlet port 182B when the third flow control device 182 is inactive or de-energized. Variable activation of the adjustable hydraulic orifice or restriction of the third flow control device 182 regulates or controls the flow of the hydraulic fluid 102 from the inlet port 182A to the outlet port 182B. The inlet port 182A is in communication with the valve feed line 180. The outlet port 182B is in communication with a valve feed line 192. The exhaust port 182C is in communication with the sump 104.

The pressure control device 140 and the third flow control device 182 communicate pressurized hydraulic fluid through the valve feed lines 180 and 192 to a mode or logic valve assembly 200. The mode or logic valve assembly 200 is operable to direct the flow of pressurized hydraulic fluid 102 from pressure control device 140 and flow control device 182 received through the valve feed lines 180 and 192, respectively, to the second synchronizer actuator 194B and to the third synchronizer actuator 194C, as will be described in greater detail below. The mode or logic valve assembly 200 includes a first inlet port 200A, a second inlet port 200B, a first outlet port 200C, a second outlet port 200D, a third outlet port 200E, a fourth outlet port 200F, a plurality of exhaust ports 200G and a control port 200H. The first inlet port 200A is in communication with valve feed line 180. The second inlet port 200B is in communication with valve feed line 192. The first outlet port 200C is in communication with an actuator supply line 210. The second outlet port 200D is in communication with an actuator supply line 212. The third outlet port 200E is in communication with an actuator supply line 214. The fourth outlet port 200F is in communication with a synchronizer supply line 216. The exhaust ports 200G are ultimately in communication with the sump 104. The control port 200H is in communication with a first control line 220. The control line 220 is in fluid communication with a mode or logic solenoid valve 222.

The mode or logic valve assembly 200 further includes a valve spool 224 slidably disposed within a valve body or bore 226. The valve spool 224 is biased toward a first of two positions by a biasing member such as a spring 228 and toward a second of two positions by fluid flow channeled from the mode or logic solenoid valve 222 through control line 220. The biasing member 228 is preferably a compression spring and acts on an end of the valve spool 224 to bias the valve spool 224 to the first, de-energized or de-stroked position. When the mode or logic solenoid valve 222 is energized or activated, a flow of the hydraulic fluid 102 is communicated to the control port 200H through the control line 220 and into a control chamber 230 of the valve assembly 200. The hydraulic fluid 102 acts on an end of the valve spool 224 to move the valve spool 224 and compress the biasing member 228 to translate the valve spool 224 to the second, energized or stroked position. A supply of pressurized hydraulic fluid is provided to the mode or logic solenoid valve 222 when either the first or the second clutch pressure control devices 136 and 138 are energized.

When the valve spool 224 is in the de-stroked position (as shown in FIG. 2B), the first inlet port 200A is in communication with the second outlet port 200D, the second inlet port 200B is in communication with the fourth outlet port 200F, and the first and third outlet ports 200C, 200E are in communication with the exhaust ports 200G. When the valve spool 224 is in the stroked position, the first inlet port 200A is in communication with the first outlet port 200C, the second inlet port 200B is in communication with the third outlet port 200E, and the second and fourth outlet ports 200D, 200F are in communication with the exhaust ports 200G.

The actuator supply line 210 feeds hydraulic fluid 102 to a fourth flow control device (VFS) 240 downstream of the mode or logic valve assembly 200. The fourth flow control device 240 is preferably an electrically controlled variable force solenoid that is operable to control a flow of the hydraulic fluid 102 from the mode or logic valve assembly 200 to the actuator 194A, as will be described in greater detail below. The fourth flow control device 240 includes an inlet port 240A that communicates with an outlet port 240B when the fourth flow control device 240 is activated or energized and includes an exhaust port 240C that communicates with the outlet port 240B when the fourth flow control device 240 is inactive or de-energized. Variable activation of the fourth flow control device 240 regulates or controls the flow of the hydraulic fluid 102 from the inlet port 240A to the outlet port 240B. The inlet port 240A is in communication with the actuator supply line 210. The outlet port 240B is in communication with an actuator fluid flow supply line 242. The exhaust port 240C is in communication with the sump 104.

The actuator supply line 212 feeds hydraulic fluid 102 to a fifth flow control device 244 downstream of valve assembly 200. The fifth flow control device 244 is preferably an electrically controlled variable force solenoid that is operable to control a flow of the hydraulic fluid 102 from the valve assembly 200 to the fourth actuator 194D, as will be described in greater detail below. The fifth flow control device 244 includes an inlet port 244A that communicates with an outlet port 244B when the fifth flow control device 244 is activated or energized and includes an exhaust port 244C that communicates with the outlet port 244B when the fifth flow control device 244 is inactive or de-energized. Variable activation of the fifth flow control device 244 regulates or controls the flow of the hydraulic fluid from the inlet port 244A to the outlet port 244B. The inlet port 244A is in communication with the actuator supply line 212. The outlet port 244B is in communication with an actuator fluid flow supply line 246. The exhaust port 244C is in communication with the sump 104.

The synchronizer actuators 194A, 194B, 194C and 194D are preferably two-area piston assemblies that are each operable to engage or actuate a shift rail in a synchronizer assembly, but can be three-area piston assemblies without departing from the scope of the present invention. For example, the first synchronizer actuator 194A is operable to actuate the first synchronizer assembly 40A, the second synchronizer actuator 194B is operable to actuate the second synchronizer assembly 40B, the third synchronizer actuator 194C is operable to actuate the third synchronizer assembly 40C, and the fourth synchronizer actuator 194D is operable to actuate the fourth synchronizer assembly 40D.

The first synchronizer actuator 194A includes a piston 300A slidably disposed within a piston housing or cylinder 302A. The piston 300A presents two separate areas of different size for pressurized hydraulic fluid to act upon. The piston 300A engages or contacts a finger lever, shift fork, or other shift rail component 304A of the first synchronizer assembly 40A. The first synchronizer actuator 194A includes a fluid port 306A that communicates with a first end 308A of the piston housing or cylinder 302A and a fluid port 310A that communicates with an opposite second end 312A of the piston housing or cylinder 302A. Fluid port 306A is in communication with the actuator fluid flow supply line 242 and fluid port 310A is in communication with the actuator supply line 210. Accordingly, the pressurized hydraulic fluid 102 supplied by the fourth flow control device 240 enters the first end 308A of the piston housing or cylinder 302A of the first synchronizer actuator 194A through the fluid port 306A and the flow of hydraulic fluid 102 from the actuator supply line 210 enters the second end 312A of the piston housing or cylinder 302A of the first synchronizer actuator 194A through the fluid port 310A. The difference in force between the hydraulic fluid 102 delivered to first end 308A and the hydraulic fluid 102 delivered to the second end 312A moves the piston 300A between various positions. Each position in turn corresponds to a position of the shift rail of the first synchronizer assembly 40A (i.e., engaged left, neutral and engaged right). A fork position sensor 314A is included to communicate to the controller 50 the position of the shift fork 304A. A first detent spring 316A which may engage the first piston 300A or other moving component of the first synchronizer actuator 194A assists locating and maintains the first piston 300A and the associated components in one of the three defined positions: left, middle and right.

The second synchronizer actuator 194B includes a piston 300B slidably disposed within a piston housing or cylinder 302B. The piston 300B presents two separate areas of different size for pressurized hydraulic fluid to act upon. The piston 300B engages or contacts a finger lever, shift fork, or other shift rail component 304B of the second synchronizer assembly 40B. The second synchronizer actuator 194B includes a fluid port 306B that communicates with a first end 308B of the piston housing or cylinder 302B and a fluid port 310B that communicates with an opposite second end 312B of the piston housing or cylinder 302B. Fluid port 306B is in communication with the actuator supply line 214 and fluid port 310B is in communication with the actuator supply line 210. Accordingly, the pressurized hydraulic fluid 102 supplied by actuator supply line 214 enters the first end 308B of the piston housing or cylinder 302B of the second synchronizer actuator 194B through the fluid port 306B and the flow of hydraulic fluid 102 from the actuator supply line 210 enters the second end 312B of the piston housing or cylinder 302B of the second synchronizer actuator 194B through the fluid port 310B. The difference in force between the hydraulic fluid 102 delivered to first end 308B and the hydraulic fluid 102 delivered to the second end 312B moves the piston 300B between various positions. Each position in turn corresponds to a position of the shift rail of the second synchronizer assembly 40B (i.e., engaged left, neutral and engaged right). A fork position sensor 314B is included to communicate to the controller 50 the position of the shift fork 304B. A second detent spring 316B which may engage the second piston 300B or other moving component of the second synchronizer actuator 194B assists locating and maintains the second piston 300B and the associated components in one of the three defined positions: left, middle and right.

The third synchronizer actuator 194C includes a piston 300C slidably disposed within a piston housing or cylinder 302C. The piston 300C presents two separate areas of different size for pressurized hydraulic fluid to act upon. The piston 300C engages or contacts a finger lever, shift fork, or other shift rail component 304C of the third synchronizer assembly 40C. The third synchronizer actuator 194C includes a fluid port 306C that communicates with a first end 308C of the piston housing or cylinder 302C and a fluid port 310C that communicates with an opposite second end 312C of the piston housing or cylinder 302C. Fluid port 306C is in communication with the synchronizer supply line 216 and fluid port 310C is in communication with the actuator supply line 212. Accordingly, the pressurized hydraulic fluid 102 supplied by synchronizer supply line 216 enters the first end 308C of the piston housing or cylinder 302C of the third synchronizer actuator 194C through the fluid port 306C and the flow of hydraulic fluid 102 from the actuator supply line 212 enters the second end 312C of the piston housing or cylinder 302C of the third synchronizer actuator 194C through the fluid port 310C. The difference in force between the hydraulic fluid 102 delivered to first end 308C from the hydraulic fluid 102 delivered to the second end 312C moves the piston 300C between various positions. Each position in turn corresponds to a position of the shift rail of the third synchronizer assembly 40C (i.e., engaged left, neutral and engaged right). A fork position sensor 314C is included to communicate to the controller 50 the position of the shift fork 304C. A third detent spring 316C which may engage the third piston 300C or other moving component of the third synchronizer actuator 194C assists locating and maintains the third piston 300C and the associated components in one of the three defined positions: left, middle and right.

The fourth synchronizer actuator 194D includes a piston 300D slidably disposed within a piston housing or cylinder 302D. The piston 300D presents two separate areas of different size for pressurized hydraulic fluid to act upon. The piston 300D engages or contacts a finger lever, shift fork, or other shift rail component 304D of the fourth synchronizer assembly 40D. The fourth synchronizer actuator 194D includes a fluid port 306D that communicates with a first end 308D of the piston housing or cylinder 302D and a fluid port 310D that communicates with an opposite second end 312D of the piston housing or cylinder 302D. Fluid port 306D is in communication with the actuator fluid flow supply line 246 and fluid port 310D is in communication with the actuator supply line 212. Accordingly, the pressurized hydraulic fluid 102 supplied by the fifth flow control device 244 enters the first end 308D of the piston housing or cylinder 302D of the fourth synchronizer actuator 194D through the fluid port 306D and the flow of hydraulic fluid 102 from the actuator supply line 212 enters the second end 312D of the piston housing or cylinder 302D of the fourth synchronizer actuator 194D through the fluid port 310D. The difference in force between the hydraulic fluid 102 delivered to first end 308D from and the hydraulic fluid 102 delivered to the second end 312D moves the piston 300D between various positions. Each position in turn corresponds to a position of the shift rail of the fourth synchronizer assembly 40D (i.e., engaged left, neutral and engaged right). A fork position sensor 314D is included to communicate to the controller 50 the position of the shift fork 304D. A fourth detent spring 316D which may engage the fourth piston 300D or other moving component of the fourth synchronizer actuator 194D assists locating and maintains the fourth piston 300D and the associated components in one of the three defined positions: left, middle and right.

Figure 3:
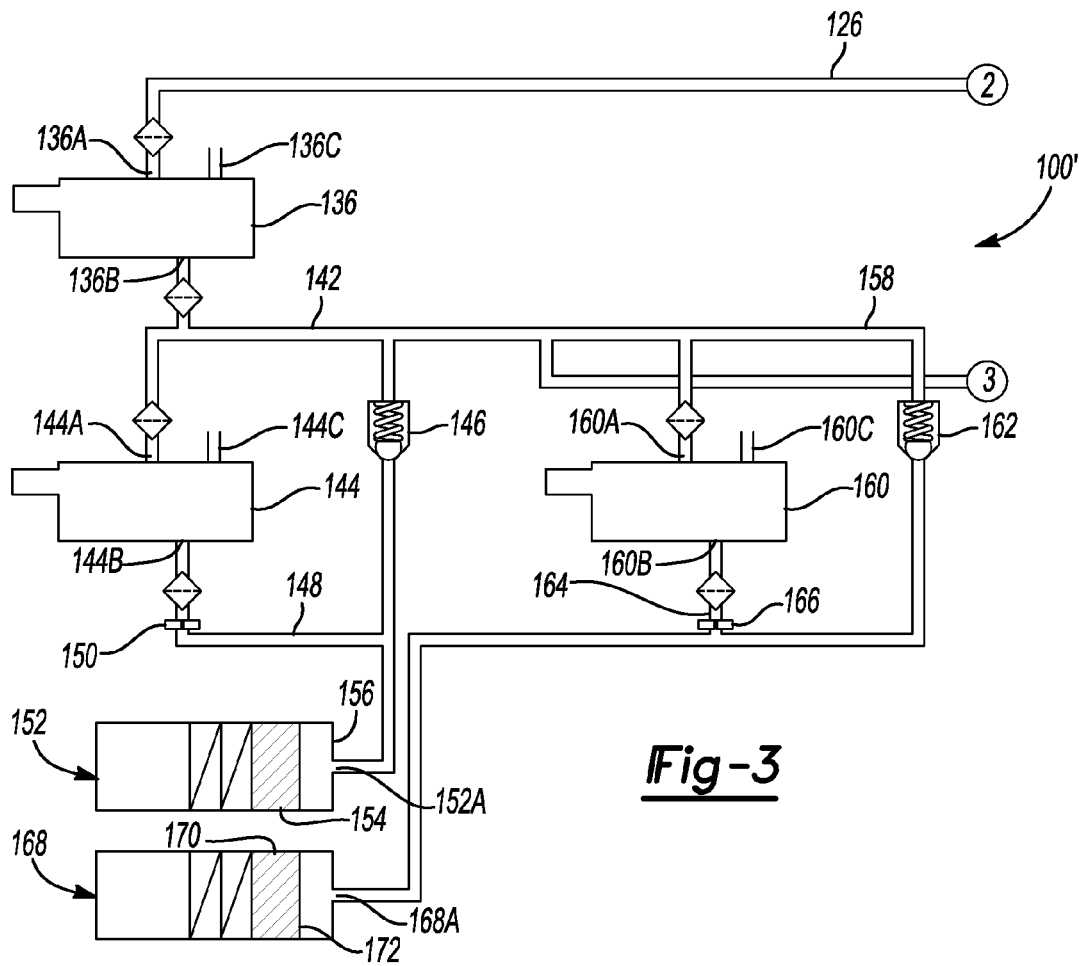
FIG. 3 is a schematic diagram of a portion of a second embodiment of a control system for a dual clutch transmission according to the present invention.

Referring to FIG. 3, a portion of a second embodiment of a control system for the dual clutch transmission 10 of FIG. 1 is illustrated and referenced by the number 100'. The control system 100' is substantially similar to control system 100 and has substantially the same components as system 100 with the exception of the pressure control device 138, the check ball 147 and the flow restriction orifice 163. With the pressure control device 138, the check ball 147 and the flow restriction orifice 163 removed, the pressure control device 136 provides the pressurized hydraulic fluid 102 to the fluid line 158. Thus, pressurized fluid 102 is supplied to the clutch flow control devices 144 and 160 and the mode or logic solenoid valve 222. It should be understood that all the remaining components of the second embodiment of the control system 100' not illustrated in FIG. 3 or discussed relative thereto are the same as those of the first embodiment control system 100 illustrated in FIGS. 2A and 2B.

Figure 4:
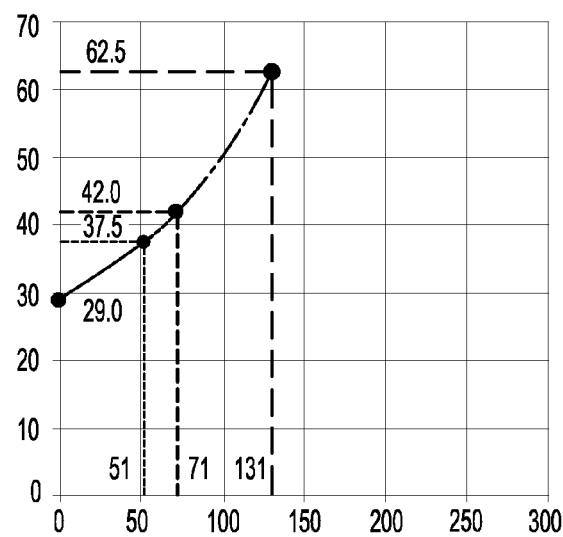
FIG. 4 is a graph presenting a plot of accumulator pressure on the Y (vertical) axis versus accumulator oil volume on the X (horizontal) axis in a control system for a dual clutch transmission according to the present invention.

The method of operation of the control systems 100 and 100' will now be further described and detailed, beginning with FIG. 4 and a description of the hydraulic fluid (oil) delivery subsystem of the control system 100 and 100'. The electrically driven, positive displacement pump 106 provides pressurized hydraulic fluid 102 which actuates the input clutches 22 and 26 and the synchronizer assemblies 40A, 40B, 40C and 40D to achieve shifts in the dual clutch transmission 10. The pump 106 provides such pressurized hydraulic fluid 102 whether or not the prime mover is running, thereby keeping the input clutches 22 and 26 staged for quick response during engine start/stop maneuvers. The pump 106 is turned on when the pressure sensor 132 indicates that the accumulator 130 needs to be recharged and is turned off when a full charge of the accumulator 130 is achieved. The pump 106 may also run at a fixed lower r.p.m. to create a closed loop pressure control during some fail safe operating modes where a failure of one of the clutch solenoids 144 and 160 could result in overpressurization of one of the input clutches 22 and 26. The pump 106 can be turned on during shift events when relatively large quantities of hydraulic fluid are removed from the accumulator 130. The pump 106 can also be turned on prior to the vehicle driver starting the engine or prime mover to charge the system 100 and the accumulator 130 before any shifting or drive away is requested. This can be accomplished by tying the opening of a door, unlocking of a door or doors or other pre-drive activity to activation of the pump 106.

During manufacture of the systems 100 and 100' and prior to their initial charging, the oil or fluid side of the accumulator 130 is de-pressurized. The piston of the accumulator 130 is pushed by the gas charge pressure and bottoms out. This provides no reserve volume of hydraulic oil or fluid 102 to be used by the transmission 10 for shifting. The pressure sensor 132 sends a signal to the transmission control module 50 to start the electric motor 106A driving the pump 106. The pump 106 will accelerate to a fixed, predetermined r.p.m. and begin pumping hydraulic fluid 102 from the sump 104, through the pressure side filter 118, the second check valve 124 and into the accumulator 130. This hydraulic fluid 102 will build pressure and begin to translate the piston of the accumulator 130 against the gas charge. The relationship of pressure and displaced volume is illustrated in FIG. 4 and is governed by the gas laws (Charles' Law and Boyle's Law). When the system 100 reaches a predetermined pressure as reported to the transmission control module 50 by the pressure sensor 132, the power to the electric pump motor 106A is shut off, causing the pump components to stop spinning. At this time, hydraulic fluid (oil) attempts to return to the pump 106 from the accumulator 130 but is prevented from doing so by the second check valve 124 which prevents such backflow. When the second check valve 124 is closed, the only direction of hydraulic fluid flow and site of consumption is within the remainder of the control system 100, namely, the clutch piston assemblies 152 and 168 and the synchronizer actuators 194A, 194B, 194C and 194D. The leakage of these components and the hydraulic fluid volume used to stroke the clutch piston assemblies 152 and 168 and synchronizer actuators 194A, 194B, 194C and 194D causes the pressure in the accumulator 130 to decrease over time. When the pressure sensor 132 reports a pressure below a pre-determined value to the transmission control module 50, the pump 106 will be commanded on to repeat the charge cycle. The pre-determined restart pressure is calculated as a function of temperature, gas charge pressure in the accumulator 130, output flow capability of the pump 106 and either learned or assumed leakage and component volume (operating) values.

Figure 5:
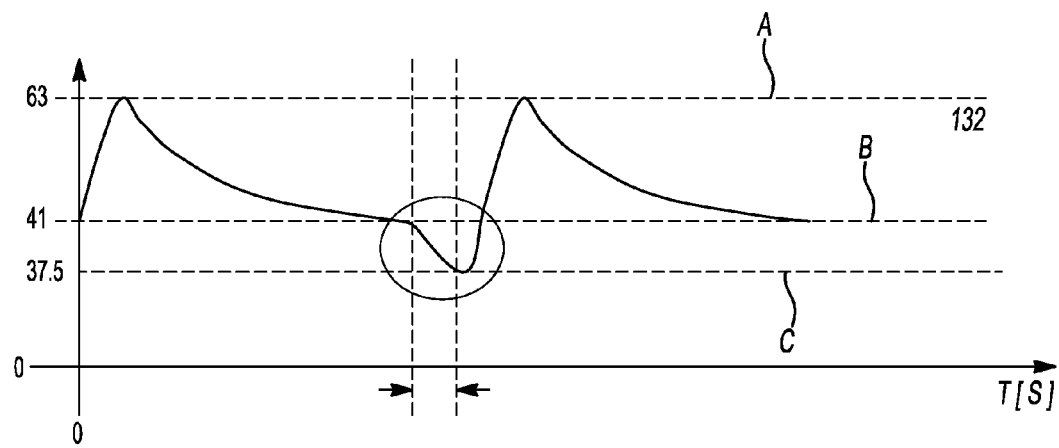
FIG. 5 is a graph presenting a plot of accumulator pressure on the Y (vertical) axis versus time on the X (horizontal) axis during a pump operating cycle in a control system for a dual clutch transmission according to the present invention.

As illustrated in FIG. 5, the restart pressure of the pump 106 is determined by calculating the pressure level of the accumulator 130 that will guarantee sufficient reserve hydraulic fluid volume in the accumulator 130 to accomplish a number of rapid shifting maneuvers. The reserve volume required is a function of the number of shifts, the volumes of the components stroked or activated, the shift time, the rate of leakage of the system 100 and the output rate of the pump 106. Once the reserve volume is determined, the restart pressure of the pump 106 can be calculated according to the gas laws. Two typical charge and discharge cycles are illustrated in FIG. 5 wherein the upper dashed line A represents the maximum charge pressure in the accumulator 130 at which the pump 106 is stopped, the middle dashed line B is the recharge pressure at which the pump 106 restarts and the lower dashed line C is the minimum operating pressure. The plot between the vertical, dashed lines D represents a worst case scenario in which the pump 106 restarts simultaneously with a large fluid demand. Such fluid demand is provided by the accumulator 130 and thus the minimum operating pressure line C is not crossed.

The blow off safety valve 116 is designed to unseat, relieve and limit the pressure of the system 100 if the pump 106 does not shut off at the proper time due to, for example, a failed electric motor 106A, a failed main pressure sensor 132 or sluggish response. The design blow-off pressure of the safety valve 116 is slightly above the maximum expected system operating pressure. For example, the maximum system pressure is 60 bar, the safety valve 116 will be nominally designed to open at 80 bar.

Figure 6:
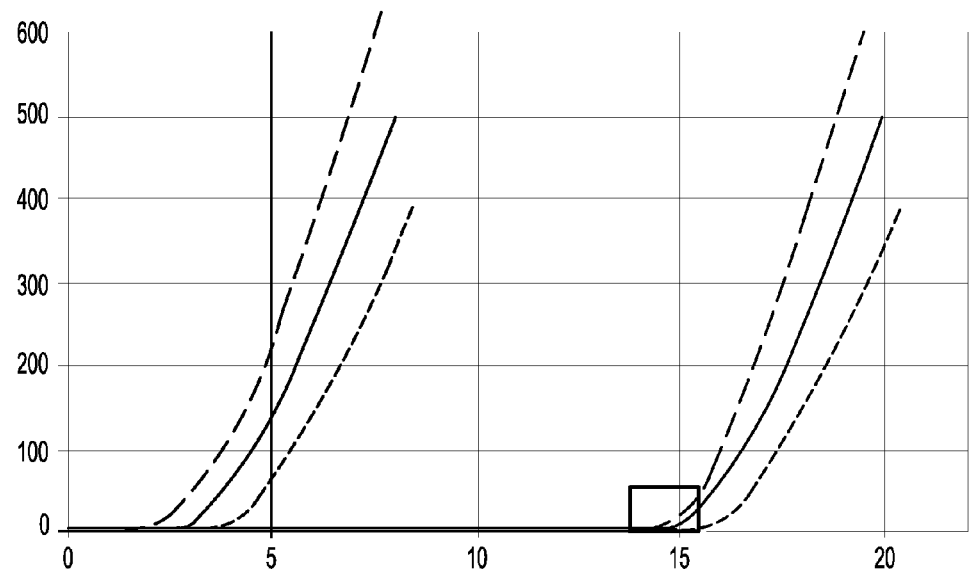
FIG. 6 is a graph presenting two plots of input clutch operation with torque transmitted through the clutch on the Y (vertical axis) in Newton-meters versus clutch position on the X (horizontal) axis in millimeters in a control system for a dual clutch transmission according to the present invention.

Referring now to FIGS. 2A, 2B and 6, further description of the first embodiment control system 100 follows. It should be appreciated that in the first embodiment control system 100, the hydraulic circuits of both, i.e., the even and the odd, input clutches 22 and 26 are identical but independent. The pressure level and flow rate of each clutch circuit can be independently commanded based upon the specific shifting or staging needs of each individual input clutch 22 and 26. Pressurized hydraulic fluid (oil) 102 from the above described components comprising the fluid or oil delivery subsystem is utilized to actuate or engage the two torque transmitting devices, i.e., the input clutches 22 and 26. In the first embodiment illustrated in FIGS. 2A and 2B, each input clutch 22 and 26 has an independent pressure control device, namely, the pressure control solenoid (PCS) valves 136 and 138. Each of the pressure control solenoid (PCS) valves 136 and 138 feeds a flow control device, namely, the flow control solenoid (FCS) valves 144 and 160 which, in turn, feed the clutch piston assemblies or actuators 152 and 168, respectively. The first clutch piston assembly or actuator 152 and the second clutch piston assembly or actuator 168, as noted above, each include a respective linear position sensor 157 and 171 which provides real time data to the transmission control module 50 regarding the positions of the clutch actuator pistons 154 and 170 to be used to create a clutch torque to position relationship as illustrated in FIG. 6. Through this process, the transmitted torque of the input clutches 22 and 26 is controlled using position as the independent variable. FIG. 6 presents plots of typical torque to position characteristics of a new clutch 22 and 26 on the left of the graph and of a worn clutch on the right of the graph. With regard to both groups of plots, the center, bold line represents an average value while the adjacent, dashed lines represents nominal limits and the box indicates the kiss point of a worn clutch.

The clutch torque to position relationship is learned as the transmission 10 is operating by associating the reported prime mover torque while the clutches 22 or 26 are slipping to the position reported to the transmission control module 50 by the respective clutch position sensors 157 and 171. Once learned, this relationship is used to provide a feed-forward control command during shifts. Closed loop control is also used to increase the accuracy of the clutch torque shift profile.

Figure 7:
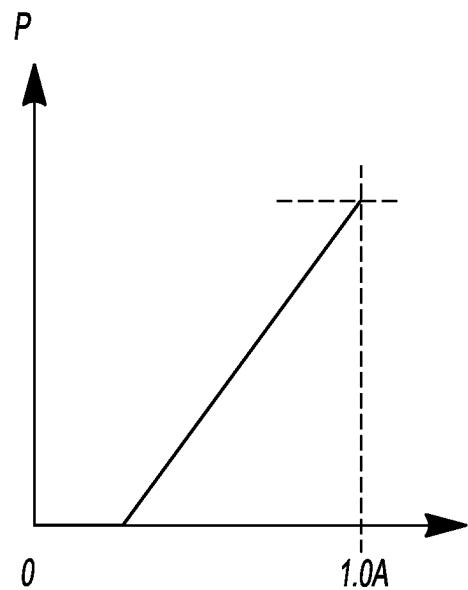
FIG. 7 is a graph presenting a plot of the operating characteristic of a pressure control solenoid (PCS) valve with output pressure on the vertical (Y) axis and applied current in amperes on the horizontal (X) axis in a control system for a dual clutch transmission according to the present invention.

Returning to the clutch pressure control devices 136 and 138, the pressure control solenoid (PCS) valves, the commanded (output) pressure level of each device 136 and 138 is calculated from the highest of three pressure requirements. The first pressure requirement is the pressure level required to provide the requested amount of fluid flow. The second pressure requirement is the pressure level required to provide, transmit and hold the requested level of clutch torque. The third pressure requirement is the pressure level required to shift the mode or logic valve 200. Once this highest pressure level is determined and provided, it establishes one side of the pressure potential across the associated clutch flow control devices 144 and 160, the flow control solenoid (FCS) valves. The clutch pressure control devices 136 and 138 have a performance characteristic, shown in FIG. 7 that relates commanded electrical current to regulated output pressure. Once the desired (commanded) output pressure is determined, the appropriate amount of current can be and is provided (commanded) to the clutch pressure control devices 136 and 138.

Figure 8:
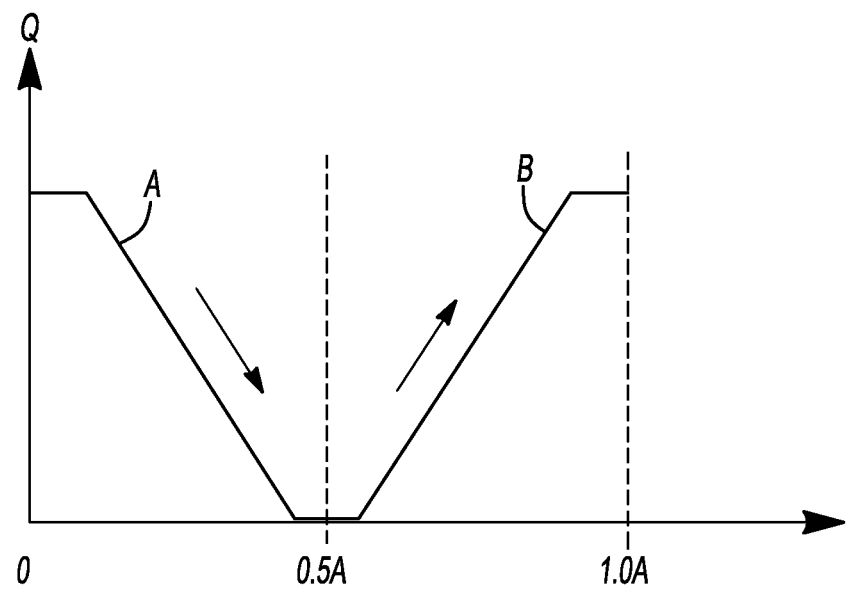
FIG. 8 is a graph presenting a plot of the operating characteristic of a flow control solenoid (FCS) valve with output volume (flow) on the vertical (Y) axis and applied current in amperes on the horizontal (X) axis in a control system for a dual clutch transmission according to the present invention.

The first and the second clutch flow control devices 144 and 160, the flow control solenoid (FCS) valves, can be thought of as variable orifice devices. These flow control solenoid valves 144 and 160 provide a relationship between electrical current and valve flow area. Once a pressure potential is supplied across the flow control solenoid valves 144 and 160, the relationship becomes: electrical current versus flow rate as illustrated in FIG. 8. The flow control solenoid valves 144 and 160 are capable of both positive (feed) flow and negative (exhaust) flow depending upon the value of the current provided (commanded). As illustrated in FIG. 8, the line A represents exhaust flow which decreases with increasing current and the line B represents feed flow which increases with increasing current. The downstream side of the pressure potential across the flow control solenoid valves 144 and 160 is the clutch pressure. The input clutches 22 and 26 have a characteristic of pressure versus position as illustrated in FIG. 9. By knowing the position of the input clutches 22 and 26, an estimate of clutch pressure can be made. This value is subtracted from the pressure delivered (commanded) by the clutch pressure control devices 136 and 138, the pressure control solenoid (PCS) valves, to establish the pressure potential across the respective clutch flow control devices 144 and 160, the flow control solenoid (FCS) valves. The proper current can then be provided (commanded) to the flow control solenoid valves 144 and 160 to produce the feed-forward component of the control flow. Closed loop control is also used and is based upon actual and commanded velocity and position of the individual pistons of the clutch piston assemblies 152 and 168.

If the input clutches 22 or 26 are being engaged, flow is positive and larger currents are provided (commanded). If the input clutches 22 or 26 are being disengaged, flow is negative and lower currents are provided (commanded). There is a current region, i.e., a deadband, in the middle of the current range where the flow is deadheaded, i.e., neither feeding nor exhausting.

The first spring loaded pressure limit control valve 146 and the second spring loaded pressure limit control valve 162 are disposed in parallel with the respective first flow control solenoid valve 144 and the second flow control solenoid valve 160 to facilitate quick release of the respective input clutches 22 and 26 or to release the respective input clutches 22 and 26 in the event of the respective flow control solenoid (FCS) valves 144 and 160 sticking in the deadheaded (deadband) region. The input clutches 22 and 26 are released through the respective pressure limit control valves 146 and 162 by reducing the output pressure of the respective pressure control solenoid (PCS) valves 136 and 138 below the hydraulic pressure In the respective input clutches 22 and 26 and respective pressure limit control valve 146 and 162 thresholds.

Turning now to FIG. 3, the second embodiment control system 100', as noted above, is essentially the same as the first embodiment control system 100 except with regard to the second pressure control solenoid (PCS) valve 138 and associated components which are eliminated. The control system 100' provides the single, first clutch pressure control device 138, the pressure control solenoid (PCS) valve, that feeds both of the first and the second flow control solenoid valves 144 and 160 that feed the independent input clutch circuits as described above. The commanded pressure level of the single, first clutch pressure control device 138, the pressure control solenoid (PCS) valve, is calculated from the highest of three pressure requirements. The first pressure requirement is the higher of the two pressure levels required to provide the requested quantity of hydraulic fluid flow to the clutch piston assemblies 152 and 168 of either of the input clutches 22 and 26. The second pressure requirement is the higher of the two pressure levels required to hold the requested amount of torque on either of the input clutches 22 and 26. The third pressure requirement is the pressure level required to shift the mode or logic valve 200. The mode or logic solenoid valve 222 is fed directly with the output single, first clutch pressure control device 138, the pressure control solenoid (PCS) valve. All other functions and operational states relating to control of the input clutches 22 and 26 are the same as the first embodiment control system 100.

Referring again to FIGS. 2A and 2B and now also to FIG. 10, the synchronizer control subsystem will be described. In FIG. 10, the upper plots represent commanded (1) versus actual (2) position of a synchronizer and the lower plot represents synchronizer pressure. The synchronizer subsystem includes the actuator pressure control device 140, a pressure control solenoid (PCS) valve, the third flow control device 182, a flow control solenoid (FCS) valve, the fourth flow control device 240, also a flow control solenoid (FCS) valve, the fifth flow control device 244, also a flow control solenoid (FCS) valve, the mode or logic valve 200, the mode or logic solenoid valve 222, the four double acting synchronizer actuators 194A, 194B, 194C and 194D and their respective linear position sensors 314A, 314B, 314C and 314D. The actuator pressure control device 140, a pressure control solenoid (PCS) valve, is multiplexed through the mode or logic valve 200 to assist control all four synchronizer actuators 194A, 194B, 194C and 194D. The third flow control device 182 which is fed directly by the actuator pressure control device 140, a pressure control solenoid (PCS) valve, is multiplexed through the mode or logic valve 200 to assist control of two of the synchronizer actuators. The remaining two flow control solenoid (FCS) valves, namely the fourth flow control device 240, and the fifth flow control device 244 help control a single actuator each. Each of these two flow control solenoid (FCS) valves, namely the devices 240 and 244, are fed by the single actuator pressure control device 140 when the mode or logic valve 200 is in the appropriate position.

As noted above, each of the synchronizer actuators 194A, 194B, 194C and 194D is a double acting device meaning that it has a positive, fully engaged position to the left, a neutral position in the middle and a positive, fully engaged position to the right. For example, the first synchronizer actuator 194A synchronizes and engages third gear when it translates to the left in FIG. 2A and synchronizes and engages fifth gear when it translates to the right, with a neutral position in the middle.

The mode or logic solenoid valve 222 is fed with the higher of the two pressures provided by the two clutch pressure control devices 136 and 138, pressure control solenoid (PCS) valves, acting through the second pressure limit control or check valve 147. The mode or logic solenoid valve 222 can be a two position, i.e., on/off, type or a pressure control solenoid (PCS) valve. As presently configured, the mode or logic solenoid valve 222 is a pressure control solenoid (PCS) valve in order to achieve regulation at a lower pressure at the control port 200H of the mode or logic solenoid valve 222 for reduced leakage.

Prior to any synchronizing and shifting event, the mode or logic valve 200 must be positioned to connect the output of the pressure and flow control solenoid valves to the correct synchronizer actuator. This is accomplished by the transmission control module 50 sending an appropriate electric current or command to the mode or logic solenoid valve 222. If the current command is low or zero, the mode or logic solenoid valve 222 will be closed and there will be no or nominal hydraulic pressure at the control port 200H of the mode or logic valve 200. The valve spool 224 of the mode or logic valve 200 will thus be in the position illustrated in FIG. 2B. If the current command is high, the mode or logic solenoid valve 222 will open and provide hydraulic pressure to the control port 200H of the mode or logic valve 200. This pressure is sufficient to translate the valve spool 224 to the left, against the biasing spring or member 228.

For example, if the mode or logic solenoid valve 222 is not energized, the output of the actuator pressure control device 140 is directed to the two even synchronizer actuators 194C and 194D. These actuators could, for example, control second and sixth gears and fourth and reverse gears, respectively. The actuator pressure control device 140 also feeds the fifth flow control device 244, a flow control solenoid (FCS) valve, that controls the other side of the synchronizer actuator 194D associated with second and sixth gears. The multiplexed output of the third flow control device 182, a flow control solenoid (FCS) valve, is directed to the other side of the synchronizer actuator 194C associated with fourth and reverse gears. In this way, both sides of the synchronizer actuators 194C and 194D associated with the even gears are manipulated by both pressure control solenoid (PCS) valve and flow control solenoid (FCS) valve control.

Continuing with the example, if the mode or logic solenoid valve 222 is energized, the output of the actuator pressure control device 140 is directed to the two odd synchronizer actuators 194A and 194B. These actuators could, for example, control third and fifth gears and first and seventh gears, respectively. The actuator pressure control device 140 also feeds the fourth flow control device 240, a flow control solenoid (FCS) valve, that controls the other side of the synchronizer actuator 194A associated with third and fifth gears. The multiplexed output of the third flow control device 182, a flow control solenoid (FCS) valve, is directed to the other side of the synchronizer actuator 194B associated with first and seventh gears. In this way, both sides of the synchronizer actuators 194A and 194B associated with the odd gears are manipulated by both pressure control solenoid (PCS) valve and flow control solenoid (FCS) valve control. Actual pairings of states of the mode or logic valve 200, positions of the pistons of the synchronizer actuators 194A, 194B, 194C and 194D, and gear pairings per synchronizer actuator will vary according to the design of the transmission 10. Accordingly, it should be understood that other such pairings and configurations are within the scope of the present invention.

Referring now to FIG. 10, operating modes or phases of the synchronizer actuators 194A, 194B, 194C and 194D include two steady state modes or phases and at least three transient modes or phases. Steady state modes include fully engaged and neutralized, i.e., in neutral. Transient modes include pre-synchronizing represented by the region A, synchronizing represented by the region B and post-synchronizing represented by the region C. All three modes are illustrated in FIG. 10 and described below.

The pistons 300A, 300B, 300C and 300D of the synchronizer actuators 194A, 194B, 194C and 194D have two opposing areas of different size. The larger area is connected to and exposed to the output of a flow control device such as the flow control solenoid (FCS) valves 182, 240 and 244 through the multiplexing strategy.

If the piston of the actuator is desired to move to the right, the pressure control device 140, a pressure control solenoid (PCS) valve, is commanded to a pressure level and the appropriate flow control device 182, 240 or 244, the flow control solenoid (FCS) valves, is commanded to a position where is will feed hydraulic fluid from the pressure control device 140 to the larger area of the piston 300A, 300B, 300C or 300D of the synchronizer actuator. Pressure builds up against the larger area and eventually an equilibrium or force balance is reached. Beyond the point, the piston will begin to move to the right against a detent spring load and the force generated by the hydraulic fluid from the pressure control device 140 on the smaller, opposing area of the piston. Alternatively, if the piston 300A, 300B, 300C or 300D of the actuator is desired to move to the left, the pressure control device 140 is commanded to a pressure level and the appropriate flow control device 182, 240 or 244 is commanded to a position where it will exhaust hydraulic fluid from the larger area side of the actuator piston. As pressure drops against the larger area, an equilibrium or force balance is again eventually reached. Beyond this point, the piston 300A, 300B, 300C or 300D will begin to move to the left due to the load of the respective detent spring 316A, 316B, 316C or 316D and the hydraulic force generated by the hydraulic fluid supplied by the pressure control device 140 on the smaller opposing area of the particular piston 300A, 300B, 300C or 300D.

The command of the output pressure of the pressure control device 140 and the positions of the flow control devices 182, 240 or 244 is dependent upon the mode of operation. When the transmission control module 50 strategy determines that a gear engagement or shift is required, the transmission control module 50 sends an electric current or signal to the mode or logic solenoid valve 222 to pre-position the valves to connect the appropriate outputs of the actuator pressure control device 140 and the flow control devices 182, 240 or 244 to the correct ports of the synchronizer actuators 194A, 194B, 194C and 194D.

After a brief interval, the transmission control module 50 commands a pre-synchronizing event as shown in region A. This event includes moving a piston 300A, 300B, 300C or 300D and the associated shift fork of one of the synchronizer actuators 194A, 194B, 194C or 194D, respectively, until the synchronizer cones contact one another and gain torque capacity. The transmission control module 50 controls movement of the synchronizer actuators 194A, 194B, 194C and 194D by use of closed loop position and velocity feedback from the appropriate linear position sensors 314A, 314B, 314C and 314D. The actuator pressure control device 140 is then commanded to a pressure level sufficient to provide the flow rate required to overcome the detent spring and drag of the particular piston 300A, 300B, 300C or 300D. The appropriate flow control device 182, 240 or 244 is also commanded to open to either feed or exhaust the hydraulic fluid against the larger area of the appropriate piston 300A, 300B, 300C or 300D depending upon the desired direction of piston travel. The timing, duration and magnitude of these commands are adjusted as dictated by the closed loop position control.

As the piston 300A, 300B, 300C or 300D of the respective synchronizer actuator 194A, 194B, 194C or 194D approaches the learned position at which synchronization will begin (region B), the velocity of the piston 300A, 300B, 300C or 300D is slowed to avoid a bump or clunk when synchronizer contact is made. Pressure from the actuator pressure control device 140 is reduced in preparation for the beginning of the synchronization phase of the shift. Once the beginning of synchronization is signaled using data from the linear position sensors 314A, 314B, 314C and 314D and speed sensor feedback, the appropriate flow control device 182, 240 or 244 is opened so it is no longer the significant flow restriction in the hydraulic circuit. This allows the controlling force on the particular piston 300A, 300B, 300C or 300D of the respective synchronizer actuator 194A, 194B, 194C or 194D to be just a function of the actuator pressure control device 140. If the desired synchronization force (and translation) is to the right in FIG. 2B, the appropriate flow control device 182, 240 or 244 opens up to feed hydraulic fluid 102. This equalizes the pressure on both sides of the piston, but since the larger area provides a larger force than the smaller area, there is a net force to the right. If the desired synchronization force (and translation) is to the left in FIG. 2B, the appropriate flow control device 182, 240 or 244 opens up to exhaust hydraulic fluid 102. This drops the pressure on the larger side of the piston, but since the smaller area is still pressurized, there is a net force to the left.

The force provided by the synchronizer actuators 194A, 194B, 194C and 194D through the synchronization mode or phase is ramped or controlled to provide a smooth speed change across the synchronizer assemblies 40A, 40B, 40C and 40D without any bumps or clunks. As the synchronization mode or phase nears its end, the pressure is lowered in anticipation of the post-synchronizing mode or phase. In the post-synchronizing phase shown in region C, the appropriate synchronizer assembly 40A, 40B, 40C or 40D indexes and allows the sleeve to move through to full engagement with the adjacent, synchronized gear. This is controlled with closed loop position and velocity control with data from the linear position sensors 314A, 314B, 314C and 314D. The velocity of the pistons 300A, 300B, 300C or 300D of the synchronizer actuators 194A, 194B, 194C and 194D is controlled to avoid a bump or clunk when the sleeve contacts and stops on the gear. The control of the actuator pressure control device 140 and the appropriate flow control device 182, 240 or 244 during the post-synchronizing mode or phase is similar to the pre-synchronizing mode or phase where a pressure level is set with the actuator pressure control device 140 and the appropriate flow control device 182, 240 or 244 is opened to either feed or exhaust hydraulic fluid to control the velocity of the particular piston 300A, 300B, 300C or 300D.

Once full engagement of the particular synchronizer assembly 40A, 40B, 40C or 40D is achieved, the output of the actuator pressure control device 140 is profiled to zero pressure as active control by the appropriate flow control device 182, 240 or 244 is maintained. This ensures that the synchronizer assembly 40A, 40B, 40C or 40D and its shift fork remains in full engagement. Once the full synchronization event is complete, the output pressure of the mode or logic solenoid valve 222 will be reduced to zero in order to minimize leakage at and proximate the control port 200H of the mode or logic valve 200. Back taper on the teeth of the synchronizer assemblies 40A, 40B, 40C and 40D and the force of the detent springs 316A, 316B, 316C and 316D will hold the synchronizers in full engagement.

Since at all times, the actuator pressure control device 140, a pressure control solenoid (PCS) valve, is connected to two of the synchronizer actuators 194A, 194B, 194C and 194D, it is necessary to control both of the connected synchronizer actuators with their respective flow control devices 182, 240 and 244 whenever an actuation or engagement event is commanded on one. This ensures that the non-targeted synchronizer actuator will remain in its commanded state as the other synchronizer actuator is moved to a new state.

When disengaging one of the synchronizer assemblies 40A, 40B, 40C and 40D from full engagement back to neutral, there is only a position and velocity controlled mode or phase. The mode or logic solenoid valve 222 is commanded to the appropriate state to connect the actuator pressure control device 140 and the flow control devices 182, 240 and 244 to the appropriate one of the synchronizer actuators 194A, 194B, 194C or 194D. The appropriate flow control device 182, 240 or 244 is opened, either to feed or exhaust hydraulic fluid depending upon the direction of desired motion of the appropriate one of the pistons 300A, 300B, 300C or 300D. The actuator pressure control device 140 is commanded to a pressure level required to generate the required flow across the appropriate flow control device 182, 240 or 244. At this point, the appropriate flow control device 182, 240 or 244 is commanded to provide or exhaust hydraulic fluid from the side of the appropriate piston 300A, 300B, 300C or 300D having the larger area, causing the piston to move. The position and velocity of the actuator piston 300A, 300B, 300C or 300D is controlled through closed loop control using feedback data from the appropriate linear position sensor 314A, 314B, 314C or 314D. As the particular synchronizer assembly 40A, 40B, 40C or 40D and its shift fork approaches the middle, neutral position, the commanded velocity is slowed. Once the particular synchronizer assembly 40A, 40B, 40C or 40D and its shift fork has reached a position near the learned middle or neutral position, the actuator pressure control device 140 is profiled off while still actively controlling the particular flow control device 182, 240 or 244. Once the hydraulic pressure is exhausted in the particular synchronizer actuator 194A, 194B, 194C or 194D, the associated detent spring 316A, 316B, 316C or 316D holds the appropriate piston 300A, 300B, 300C or 300D in the middle or neutral position. The mode or logic solenoid valve 222 is then commanded to zero pressure to minimize leakage at and adjacent the control port 200H of the mode or logic valve 200.

The description of the invention is merely exemplary in nature and variations that do not depart from the gist of the invention are intended to be within the scope of the invention. Such variations are not to be regarded as a departure from the spirit and scope of the invention.

What is claimed is:

1. A method of controlling a dual clutch transmission comprising, in combination,
   providing a flow of pressurized hydraulic fluid,
   directing a portion of such flow of pressurized hydraulic fluid serially through a first pressure control device and a first flow control device to a first clutch actuator and sensing a position of such first clutch actuator,
   directing another portion of such flow of pressurized hydraulic fluid serially through a second pressure control device and a second flow control device to a second clutch actuator and sensing a position of such second clutch actuator, and
   directing another portion of such flow of pressurized hydraulic fluid to an actuator pressure control device,
   directing portions of pressure controlled flow from said actuator pressure control device to a logic valve and a third flow control device,
   directing flow of hydraulic fluid from said third flow control device to said logic valve,
   selectively directing flow and pressure controlled hydraulic fluid from said logic valve through a fourth flow control device to a first hydraulic shift actuator, to a second hydraulic shift actuator, to a third hydraulic shift actuator and through a fifth flow control device to a fourth hydraulic shift actuator.

2. The method of controlling a dual clutch transmission of claim 1 further including the step of detecting the positions of said four hydraulic shift actuators with a respective linear position sensor.

3. The method of controlling a dual clutch transmission of claim 1 further including the step of providing a transmission control module.

4. The method of controlling a dual clutch transmission of claim 1 further including the step of reducing hydraulic pressure of fluid directed to said hydraulic shift actuators as synchronization is achieved.

5. The method of controlling a dual clutch transmission of claim 1 wherein said sensed positions of said clutch actuators provides compensation for wear of associated clutches.

6. The method of controlling a dual clutch transmission of claim 1 wherein said flow control devices provide both forward and reverse flow.

7. The method of controlling a dual clutch transmission of claim 1 further including the step of providing hydraulic fluid to and exhausting hydraulic fluid from a control port in said logic valve.

8. A method of controlling a dual clutch transmission comprising, in combination,
   providing a flow of pressurized hydraulic fluid,
   controlling a pressure of a flow of a portion said flow of pressurized hydraulic fluid, controlling a first flow of a portion of said pressure controlled flow of hydraulic fluid and providing said first controlled flow to a first clutch actuator, controlling a second flow of another portion of said pressure controlled flow of hydraulic fluid and providing said second controlled flow to a second clutch actuator, controlling a pressure of another portion of said flow of pressurized hydraulic fluid and providing said pressure controlled another portion of said flow of pressurized hydraulic fluid to a logic valve and through a flow control device to said logic valve, controlling a first hydraulic fluid flow from said logic valve to a first hydraulic shift actuator, providing a second hydraulic fluid flow from said logic valve to a second hydraulic shift actuator, providing a third hydraulic fluid flow from said logic valve to a third hydraulic shift actuator and controlling a fourth hydraulic fluid flow from said logic valve to a fourth hydraulic shift actuator.

9. The method of controlling a dual clutch transmission of claim 8 further including the step of reducing hydraulic pressure of fluid directed to said hydraulic shift actuators as synchronization is achieved.

10. The method of controlling a dual clutch transmission of claim 8 further including the step of sensing the positions of said first and said second clutch actuators.

11. The method of controlling a dual clutch transmission of claim 10 wherein said sensed positions of said clutch actuators controls compensation for wear of associated clutches.

12. The method of controlling a dual clutch transmission of claim 8 wherein said controlled flow is in both forward and reverse directions.

13. The method of controlling a dual clutch transmission of claim 8 further including the step of providing hydraulic fluid to and exhausting hydraulic fluid from a control port in said logic valve.

14. A method of controlling a dual clutch transmission comprising, in combination, providing a flow of pressurized hydraulic fluid, controlling a pressure of a flow of a portion of said flow of pressurized hydraulic fluid, controlling a flow of said pressure controlled flow of said portion of said flow of said pressurized hydraulic fluid and providing said pressure and flow controlled portion of said flow of said pressurized hydraulic fluid to a first clutch actuator, controlling a pressure of a flow of another portion of said flow of pressurized hydraulic fluid, controlling a flow of said pressure controlled flow of said another portion of said flow of said pressurized hydraulic fluid and providing said pressure and flow controlled another portion of said flow of said pressurized hydraulic fluid to a second clutch actuator, controlling a pressure of yet another portion of said flow of pressurized hydraulic fluid and providing said pressure controlled another portion of said flow of pressurized hydraulic fluid to a logic valve and through a flow control device to said logic valve, controlling a first hydraulic fluid flow from said logic valve to a first hydraulic shift actuator, providing a second hydraulic fluid flow from said logic valve to a second hydraulic shift actuator, providing a third hydraulic fluid flow from said logic valve to a third hydraulic shift actuator and controlling a fourth hydraulic fluid flow from said logic valve to a fourth hydraulic shift actuator.

15. The method of controlling a dual clutch transmission of claim 14 further including the step of sensing the positions of said first and said second clutch actuators.

16. The method of controlling a dual clutch transmission of claim 15 wherein said sensed positions of said clutch actuators controls compensation for wear of associated clutches.

17. The method of controlling a dual clutch transmission of claim 14 wherein said controlled flow is in both forward and reverse directions.

18. The method of controlling a dual clutch transmission of claim 14 further including the step of providing hydraulic fluid to and exhausting hydraulic fluid from a control port in said logic valve.

* * * * *